3,219,715
PREPARATION OF POLYMETHYL-CYCLOHEXANES

Abraham Schneider, Overbrook Hills, Pa., assignor to Sun Oil Company, Philadelphia, Pa., a corporation of New Jersey
No Drawing. Filed June 15, 1962, Ser. No. 202,689
15 Claims. (Cl. 260—666)

This application is a continuation-in-part of my copending application Serial No. 86,305, filed February 1, 1961, now abandoned.

This invention relates to the preparation of polymethylcyclohexanes which are mainly of the $C_{10}$–$C_{11}$ range by the reaction of a $C_7$ naphthene with paraffin hydrocarbon having seven or more carbon atoms per molecule.

According to the invention, polymethylcyclohexanes are prepared by contacting a mixture of a $C_7$ naphthene and paraffin hydrocarbon having seven or more carbon atoms at a temperature in the range of 0–60° C., preferably 20–45° C., with an aluminum halide catalyst which can be either an $AlCl_3$–$HCl$ catalyst or an $AlBr_3$–$HBr$ catalyst. Under the reaction conditions used, the paraffin hydrocarbon cleaves to form fragments which alkylate the $C_7$ naphthene. If the starting paraffin contains seven carbon atoms, the main alkylation reaction that occurs is between the $C_7$ naphthene and a $C_3$ fragment formed from the paraffin, resulting in the formation of tetramethylcyclohexanes. If the starting paraffin has more than seven carbon atoms, the main alkylation reaction obtained is between the $C_7$ naphthene and a $C_4$ fragment resulting from cleavage of the paraffin, and the principal alkylation product is pentamethylcyclohexanes. Isobutane is invariably produced as another product of the process. The reaction must be carried out in the absence of a hydrogen atmosphere, as otherwise the desired alkylation of the $C_7$ naphthene would be inhibited and substantially the only resulting reaction would be cracking of the paraffin component of the feed.

Any $C_7$ naphthene is suitable for use in the present process. Examples are methylcyclohexane, dimethylcyclopentane, ethylcyclopentane, trimethylcyclobutane, methylethylcyclobutane, propylcyclobutane and cycloheptane. Any of these which have a ring containing other than six carbon atoms will isomerize under the reaction conditions to an equilibrium mixture of $C_7$ naphthenes composed largely of methylcyclohexane. This equilibrium mixture of naphthenes will undergo alkylation by fragments resulting from cleavage of the paraffin reactant to form alkylcyclohexanes of higher molecular weight which mainly have four substituent carbon atoms when a $C_7$ paraffin is used as reactant or five substituent carbon atoms when a $C_8$ or higher paraffin is employed. The $C_{10}$–$C_{11}$ naphthenes thus formed isomerize under the reaction conditions to become tetramethyl and pentamethyl cyclohexanes. Smaller amounts of $C_8$ and $C_9$ naphthenes also are generally formed. Both the $C_{10}$ naphthenes and the $C_{11}$ naphthenes obtained include gem-compounds which boil substantially lower than their non-gem isomers and can readily be separated therefrom by distillation.

The paraffin used can be any heptane, octane, nonane, decane or higher molecular weight paraffin, for example, paraffin wax or mixtures of such paraffins. This is no real upper limit on the molecular weight of the paraffin used and paraffins of 30 or more carbon atoms can be used if desired. Any of the paraffins having at least 7 carbon atoms will cleave under the reaction conditions to form fragments that function as the alkylating agent for forming the polymethylcyclohexanes. As previously indicated, heptanes will cleave under the reaction conditions to form a $C_3$ fragment that causes principally the formation of tetramethylcyclohexanes. All higher paraffins cleave to form a $C_4$ fragment that results mainly in the formation of pentamethylcyclohexanes. The reaction will proceed faster with isoparaffins than with normal paraffins. The weight ratio of the paraffinic component to the $C_7$ naphthene in the feed can vary widely but generally should be in the range of 1:2 to 10:1 and more preferably 1:1 to 5:1.

A particularly suitable starting material for the present process when it is desired to produce tetramethylcyclohexanes is an aromatic-free $C_7$ fraction of petroleum such as a straight run petroleum fraction having a boiling range of 85–105° C. This fraction generally contains the following components: n-heptane, isoheptanes, methylcyclohexane and dimethylcyclopentane. Thus it provides both the naphthenic and the paraffinic components required for the reaction. The starting material should not contain any aromatic component, as aromatic hydrocarbons will quickly cause deactivation of the catalyst.

An aluminum halide catalyst obtained by combining $AlCl_3$ with $HCl$ or $AlBr_3$ with $HBr$ is used to effect the reaction. With either aluminum halide the catalyst preferably is a pre-formed liquid complex obtained by reacting the aluminum halide and hydrogen halide in the presence of one or more paraffin hydrocarbons having at least seven and more preferably at least eight carbon atoms. When $AlCl_3$ is used it is preferable to employ paraffin hydrocarbons which have more than eight carbon atoms. This complex type of catalyst is insoluble in the reaction mixture, and the activity of the catalyst depends upon having at least a small amount of uncomplexed $AlCl_3$ or $AlBr_3$ present therein. The catalyst complex is a colored mobile liquid and typically is bright orange-yellow. In preparing the complex any paraffin hydrocarbon or mixture of such paraffins having seven or more carbon atoms can be used, but it is desirable to use a branched paraffin, e.g., one having at least two branches, in order to reduce the time for preparing the complex and it is particularly preferred that such isoparaffins have at least eight carbon atoms per molecule. The proportion of catalyst complex to monocyclic naphthene charged is not critical but it is generally desirable to employ a weight ratio of complex to hydrocarbon of at least 1:10 and more preferably at least 1:1. A slow degradation of the catalyst generally will occur over a course of time, particularly when $AlBr_3$ is used to make the catalyst, but the addition of a small amount of fresh aluminum halide from time to time will reactivate the catalyst. Also a portion or all of the catalyst complex can be replaced from time to time by fresh catalyst complex to maintain catalytic activity.

Preparation of the catalyst complex comprises dissolving or suspending the aluminum halide in the paraffin hydrocarbon and passing the hydrogen halide into the mixture. This can be done at room temperature, although the use of an elevated temperature such as 50–100° C. generally is desirable to increase the rate of reaction. For best results at least five moles of the paraffin per mole of $AlCl_3$ or $AlBr_3$ should be employed. Under these conditions some of the paraffin evidently breaks into fragments, yielding a $C_4$ fragment which becomes the hydrocarbon portion of the complex. In the case of $AlBr_3$, as the reaction proceeds the mixture becomes milky and the orange-yellow liquid complex then precipitates from the hydrocarbon phase. Addition of HBr is continued until the milky appearance has disappeared. For obtaining the most active catalyst complex the addition of HBr should be stopped at this point. When $AlCl_3$ is used to make the catalyst, such milky appearance does not appear as the HCl is added. Instead the particles of $AlCl_3$ in suspension in the hydrocarbon merely become converted to the liquid complex. The addition of HCl is stopped before all of the $AlCl_3$ reacts so that the complex formed will contain some $AlCl_3$ particles suspended therein. The resulting complexes made with either $AlCl_3$ or $AlBr_3$ are relatively stable materials having high catalytic activity.

When the aluminum halide is $AlBr_3$, the catalyst can also be used with the $AlBr_3$ dissolved in the hydrocarbon reactants so that the reaction mixture is homogeneous. When using this type of catalyst system, the $AlBr_3$ is dissolved in the hydrocarbon charge to the extent of 5–200% by weight on the hydrocarbons and HBr is pressured into the mixture in amount of at least 0.25% by weight of the hydrocarbons. The resulting reaction mixture remains homogeneous as the reaction occurs. With $AlCl_3$ a homogeneous system cannot be used since $AlCl_3$ is essentially insoluble in hydrocarbons.

The following examples, in which percentages are by weight, illustrate the invention more specifically:

EXAMPLE I

A catalyst complex was prepared by admixing 5 g. of $AlBr_3$ with 8 ml. of dimethylhexanes and then bubbling in HBr until no further absorption thereof was obtained. The complex separated from the excess dimethylhexanes as a yellow oily layer which contained about 1 g. of HBr, and the excess hydrocarbon was removed. A reaction mixture was prepared in a small glass reactor, the mixture being composed of 6.0 g. of the complex and 3.5 ml. of hydrocarbon composed of 51.4% of methylcyclohexane and 48.6% of n-octane. The mixture was continuously shaken on a rocker arm and reacted at a temperature of 30° C. At times of 123 and 228 minutes, small samples of the hydrocarbon phase were taken and analyzed for hydrocarbon composition of vapor phase chromatography. Results are shown in Table I.

*Table I*

| Reaction time, minutes | 123 | 228 |
|---|---|---|
| Product composition, wt. percent: | | |
| $C_4$ paraffins | 9.6 | 15.9 |
| $C_5$ paraffins | 1.8 | 3.4 |
| $C_6$ paraffins | 0.7 | 0.8 |
| $C_7$ paraffins | 0.7 | 0.8 |
| $C_7$ naphthenes | 52.6 | 43.5 |
| Doubly branched octanes | | |
| Singly branched octanes | 10.0 | 10.0 |
| n-Octane | 14.2 | 8.4 |
| $C_8$ naphthenes | 0.9 | 1.6 |
| $C_9$ naphthenes | 0.6 | 1.2 |
| $C_{10}$ naphthenes | 1.2 | 2.0 |
| $C_{11}$ naphthenes | 7.7 | 11.1 |
| Decalin | | Trace |
| Methyldecalins | | Trace |
| Higher boiling | | 1.1 |

The tabulated data show that $C_{11}$ naphthenes form as the reaction proceeds. These products are mainly pentamethylcyclohexanes including isomers having gem substitution. From the data it can be calculated that about 38% of the starting hydrocarbons were consumed in a reaction time of 228 minutes and that about 33% by weight of the amount consumed was converted to $C_{11}$ naphthenes. The $C_4$–$C_7$ paraffins produced were mainly isoparaffins, and particularly isobutane was formed in substantial yield.

EXAMPLE II

This example illustrates the preparation of tetramethylcyclohexanes using n-heptane as the paraffin component of the feed. The reaction was carried out in essentially the same way as in the preceding example except that the hydrocarbon charge was a blend composed of 50.8% of n-heptane and 49.2% of methylcyclohexane. The compositions of the reaction mixture for various reaction times are shown in Table II.

*Table II*

| Reaction time, minutes | 60 | 120 | 960 |
|---|---|---|---|
| Product composition, wt. percent: | | | |
| $C_3$ paraffins | 0.05 | 0.1 | 0.3 |
| $C_4$ paraffins | 1.6 | 5.4 | 24.3 |
| $C_5$ paraffins | 0.4 | 0.9 | 4.7 |
| $C_6$ paraffins | 0.2 | 0.6 | 2.7 |
| $C_7$ paraffins | 48.0 | 44.6 | 21.6 |
| $C_7$ naphthenes | 48.0 | 43.1 | 20.3 |
| $C_8$ naphthenes | 0.2 | 0.5 | 3.9 |
| $C_9$ naphthenes | 0.1 | 0.4 | 3.3 |
| $C_{10}$ naphthenes | 1.4 | 4.5 | 10.6 |
| $C_{11}$ naphthenes | | 0.3 | 2.2 |
| Decalin | | | 0.3 |
| Methyldecalins | | | 0.7 |
| Dimethyldecalins | | | 1.1 |
| Higher boiling | | | 4.0 |

The data show that in this case the principal alkylation product was $C_{10}$ naphthenes. These were a mixture of tetramethylcyclohexanes including isomers having gem substitution. At the final reaction time of 960 minutes about 59% of the $C_7$ naphthene had been consumed and the yield of tetramethylcyclohexanes based on the $C_7$ naphthene which disappeared was about 30%.

EXAMPLE III

The charge was composed of 49.8% of methylcyclohexane and 50.2% of n-nonane. The reaction was carried out under the same conditions as in the preceding examples except that the temperature was maintained at 330° C. Compositions of the reaction product for two times of reaction are shown in Table III.

*Table III*

| Reaction time, minutes | 60 | 298 |
|---|---|---|
| Product composition, wt. percent: | | |
| $C_4$ paraffins | 2.9 | 8.3 |
| $C_5$ paraffins | 4.6 | 10.9 |
| $C_6$ paraffins | 0.5 | 0.8 |
| $C_7$ paraffins | 0.1 | 0.1 |
| $C_7$ naphthenes | 43.9 | 34.8 |
| Doubly branched nonanes | 7.5 | 9.7 |
| Singly branched nonanes | 9.5 | 8.2 |
| n-Nonane | 25.3 | 13.7 |
| $C_{10}$ naphthenes | 0.8 | 1.6 |
| $C_{11}$ naphthenes | 4.9 | 11.2 |
| Higher boiling | | 0.8 |

The data show that the principal alkylation product when using a $C_9$ paraffin is pentamethylcyclohexanes. During 298 minutes reaction time about 30% of the $C_7$ naphthene charged was consumed and the yield of pentamethylcyclohexanes based on the $C_7$ naphthene that disappeared was about 48%.

EXAMPLE IV

In this example a branched heptane was used as the paraffin component of the feed which specifically was composed of 47.3% 2,4-dimethylpentane and 52.7% methylcyclohexane. Reaction conditions were the same as in Example I except that the reaction first was conducted at 29° C. for 60 minutes, following which the temperature was raised to 45° C. and held at that level for an additional period of 68 minutes. Compositions of the reaction mixture are given in Table IV.

Table IV

| Temperature, ° C | 29 | 45 |
|---|---|---|
| Reaction time, minutes | 60 | 128 |
| Product composition, wt. percent: | | |
| $C_3$ paraffins | Trace | Trace |
| $i$-$C_4$ paraffins | 13.7 | 25.9 |
| $i$-$C_5$ paraffins | 3.6 | 6.0 |
| $i$-$C_6$ paraffins | 2.1 | 3.4 |
| $i$-$C_7$ paraffins | 33.7 | 23.8 |
| Methylcyclohexane | 30.2 | 17.4 |
| $C_8$ naphthenes | 1.73 | 4.01 |
| $C_9$ naphthenes | 1.32 | 3.19 |
| $C_{10}$ naphthenes | 9.26 | 9.57 |
| $C_{11}$ naphthenes | 2.22 | 1.59 |
| Decalin | | 0.08 |
| Methyldecalins | 0.17 | 0.44 |
| Dimethyldecalins | 0.15 | 0.73 |
| Trimethyldecalins | 0.59 | 1.82 |
| Tetramethyldecalins | 1.29 | 2.14 |

Again, as in Example II where n-heptane was used as feed component, the principal alkylation product was tetramethylcyclohexanes.

EXAMPLE V

In this case a $C_{16}$ paraffin, namely, cetane, was used as feed component. The charge was composed of 49.9% methylcyclohexane and 50.1% cetane. The reaction was conducted in the same manner as in Example I except that the reaction temperature was held at 0° C. for a time of 120 minutes, following which it was maintained at about 25° C. for an additional 32 minutes. Reaction mixture compositions are shown in Table V.

Table V

| Temperature, ° C | 0 | 0 | 25 |
|---|---|---|---|
| Reaction time, minutes | 30 | 120 | 152 |
| Product composition, wt. percent: | | | |
| $i$-$C_4$ paraffins | 3.3 | 7.1 | 10.7 |
| $i$-$C_5$ paraffins | 2.8 | 4.8 | 6.6 |
| $i$-$C_6$ paraffins | 1.4 | 2.6 | 4.2 |
| $i$-$C_7$ paraffins | 0.6 | 1.3 | 2.7 |
| $C_7$ naphthenss | 42.2 | 32.1 | 26.6 |
| $C_8$ naphthenes | 0.67 | 2.60 | 4.00 |
| $C_9$ naphthenes | 0.43 | 2.14 | 3.41 |
| $C_{10}$ naphthenes | 0.23 | 1.92 | 3.57 |
| $C_{11}$ naphthenes | 1.54 | 6.96 | 8.21 |
| Methyldecalins | | Trace | 0.32 |
| Dimethyldecalins | | 0.15 | 0.67 |
| Trimethyldecalins | | | 0.78 |
| Tetramethyldecalins | | 0.18 | 4.76 |
| Isocetanes | 0.2 | 2.4 | Trace |
| Cetane | 46.8 | 35.7 | 23.5 |

From the tabulated data it can be seen that the alkylation reaction that occurred favored the formation of $C_{11}$ naphthenes (pentamethylcyclohexanes).

EXAMPLE VI

In this example a saturate fraction from straight run gas oil was used to supply the paraffinic component of the feed and the latter was a blend of 48.2% methylcyclohexane and 51.8% of the gas oil saturates. The reaction was carried out at about 25° C. Compositions of the charge and of the product at reaction times of 30 and 120 minutes are shown in Table VI.

Table VI

| Reaction time, minutes | Charge | 30 | 120 |
|---|---|---|---|
| Product composition, wt. percent: | | | |
| $i$-$C_4$ paraffins | | 10.7 | 13.0 |
| $i$-$C_5$ paraffins | | 6.5 | 8.3 |
| $i$-$C_6$ paraffins | | 4.0 | 4.7 |
| $i$-$C_7$ paraffins | | 2.0 | 2.7 |
| $C_7$ naphthenes | 48.2 | 36.8 | 28.2 |
| $C_8$ naphthenes | | 4.85 | 6.26 |
| $C_9$ naphthenes | | 4.33 | 5.76 |
| $C_{10}$ naphthenes | | 4.47 | 5.78 |
| $C_{11}$ naphthenes | | 8.44 | 10.45 |
| Methyldecalins | | 0.62 | 0.69 |
| Intermediate material | 0.78 | | |
| n-$C_{11}H_{24}$ | 0.59 | | |
| Intermediate | 0.39 | | |
| n-$C_{12}H_{26}$ | 0.98 | 0.40 | 0.23 |
| Intermediate | 0.78 | | |
| Dimethyldecalins | | 1.26 | 1.89 |
| Trimethyldecalins | | 2.00 | 1.53 |
| n-$C_{13}H_{28}$ | 1.57 | | |
| Intermediate | 1.57 | | |
| Tetramethyldecalins | | 2.51 | 2.70 |
| n-$C_{14}H_{30}$ | 2.75 | 1.14 | 0.92 |
| Intermediate | 3.92 | | |
| n-$C_{15}H_{32}$ | 5.30 | 1.82 | 1.64 |
| Intermediate | 5.10 | 1.63 | 0.93 |
| n-$C_{16}H_{34}$ | 6.08 | 2.00 | 1.23 |
| Intermediate | 6.67 | 0.87 | 0.35 |
| n-$C_{17}H_{36}$ | 5.88 | 1.65 | 0.92 |
| Intermediate | 2.55 | | 0.30 |
| n-$C_{18}H_{38}$ | 4.31 | 1.06 | 0.83 |
| Intermediate | Trace | 0.28 | |
| n-$C_{19}H_{40}$ | 2.55 | 0.70 | 0.68 |

At the end of the reaction period about 41% of the methylcyclohexane had been consumed and the yield of pentamethylcyclohexanes based on the methylcyclohexane which disappeared was about 33%.

The foregoing examples illustrate the fact that any paraffin hydrocarbon having seven or more carbon atoms can be caused to alkylate methylcyclohexane in the present process to make polymethylcyclohexanes, and also that the formation of tetra methylcyclohexanes will be favored when a $C_7$ paraffin is employed while the use of any higher paraffin favors the formation of pentamethylcyclohexanes. Additionally smaller amounts of $C_8$ and $C_9$ naphthenes are produced. When any other $C_7$ naphthene is substituted for methylcyclohexane, substantially the same results are obtained.

As previously mentioned the pentamethylcyclohexanes produced in the present reaction include some gem compounds which are the lowest boiling part of the $C_{11}$ naphthene product and hence can be recovered separately. It has been found that these gem compounds can be passed over a dehydrogenation catalyst, such as platinum on alumina or activated carbon, at a temperature of the order of 400–450° C. and that they will thereby be converted to tetramethylbenzenes. The reaction involves cracking off one of the gem substituent methyl groups from the cyclohexane ring followed by dehydrogenation of the latter to a benzene ring. The resulting tetramethylbenzenes, which are constituted of the three isomers, durene, isodurene and prehnitene, are used in various organic syntheses, for example, in the preparation of polycarboxylic aromatic acids. The pentamethylcyclohexanes from which the gem compounds have been removed can be treated at 0–60° C. with the above-described liquid catalyst complex to form an equilibrium mixture of pentamethylcyclohexanes including the gem substituted compounds which likewise can be subjected to the demethylation-dehydrogenation reaction to produce additional quantities of tetramethylbenzenes. Hence the invention provides a means of converting a $C_7$ naphthene together with any $C_8$ or higher paraffin into tetramethylbenzenes.

Similarly the $C_{10}$ naphthenes that can be produced by the present process include gem compounds that characteristically are lower boiling than their isomers. These gem compounds can be recovered and subjected to the same type of demethylation-dehydrogenation reaction to form trimethylbenzenes. The non-gem isomers can be re-equilibrated by means of the aluminum halide catalyst herein described to produce more $C_{10}$ gem compounds.

Thus the invention provides a means of converting a $C_7$ naphthene together with a $C_7$ paraffin into compounds such as mesitylene and pseudocumene.

The present invention can also be used in conjunction with my invention described and claimed in my copending application Serial No. 202,690, filed June 15, 1962, now abandoned, to prepare cyclohexane from methylcyclohexane. The procedure involves first converting methylcyclohexane to tetramethylcyclohexanes by the process as herein described. The tetramethylcyclohexanes can then be converted to cyclohexane and isobutane by the process described in said application. This involves contacting the tetramethylcyclohexanes at 50–80° C. while under a pressure of hydrogen and in the absence of any paraffin hydrocarbon with the same type of catalyst system as used in the present process. Under these conditions the alkyl substituents are removed from the tetramethylcyclohexanes mainly as isobutane and cyclohexane is obtained as product. In this manner methylcyclohexane, which is relatively plentiful in petroleum, can be converted to cyclohexane which is less plentiful.

I claim:

1. Method of preparing polymethylcyclohexanes including gem-polymethylcyclohexanes, said polymethylcyclohexanes having at least 4 methyl substituents on the cyclohexane ring, which comprises contacting a mixture of a $C_7$ naphthene and paraffin hydrocarbon having at least seven carbon atoms at a temperature in the range of 0–60° C. and in the absence of a hydrogen atmosphere with a catalyst selected from the group consisting of $AlCl_3$–HCl catalyst and $AlBr_3$–HBr catalyst, and separating from the reaction mixture a polymethylcyclohexane product of the $C_{10}$–$C_{11}$ range, said product containing polymethylcyclohexanes, including gem-polymethylcyclohexanes, having at least 4 methyl substituents on the cyclohexane ring.

2. Method according to claim 1 wherein said paraffin hydrocarbon has seven carbon atoms and tetramethylcyclohexanes are separated from the reaction mixture.

3. Method according to claim 1 wherein said paraffin hydrocarbon has more than seven carbon atoms and pentamethylcyclohexanes are separated from the reaction mixture.

4. Method according to claim 1 wherein the temperature is in the range of 20–45° C.

5. Method according to claim 1 wherein said catalyst is a pre-formed liquid complex obtained by reacting $AlCl_3$–HCl and paraffin hydrocarbon having at least seven carbon atoms.

6. Method according to claim 1 wherein said catalyst is a pre-formed liquid complex obtained by reacting $AlBr_3$–HBr and paraffin hydrocarbon having at least seven carbon atoms.

7. Method of preparing tetramethylcyclohexanes including gem-tetramethylcyclohexanes which comprises contacting an aromatic-free $C_7$ fraction of petroleum composed of $C_7$ naphthene and paraffin hydrocarbons at a temperature in the range of 0–60° C. and in the absence of a hydrogen atmosphere with a catalyst selected from the group consisting of $AlCl_3$–HCl catalyst and $AlBr_3$–HBr catalyst and separating tetramethylcyclohexanes including gem-tetramethylcyclohexanes from the reaction mixture.

8. Method according to claim 7 wherein said catalyst is a pre-formed liquid complex obtained by reacting $AlCl_3$–HCl and paraffin hydrocarbon having at least seven carbon atoms.

9. Method according to claim 8 wherein the temperature is in the range of 20–45° C.

10. Method according to claim 7 wherein said catalyst is a pre-formed liquid complex obtained by reacting $AlBr_3$–HBr and paraffin hydrocarbon having at least seven carbon atoms.

11. Method according to claim 10 wherein the temperature is in the range of 20–45° C.

12. Method of preparing gem-tetramethylcyclohexanes which comprises contacting a mixture of a $C_7$ naphthene and $C_7$ paraffin hydrocarbon at a temperature in the range of 0–60° C. and in the absence of a hydrogen atmosphere with a catalyst selected from the group consisting of $AlCl_3$–HCl catalyst and $AlBr_3$–HBr catalyst, separating from the reaction mixture a fraction containing tetramethylcyclohexanes including both gem and non-gem isomers, and distilling said fraction to obtain a distillate composed mainly of gem-tetramethylcyclohexanes.

13. Method according to claim 12 wherein the temperature is in the range of 20–45° C.

14. Method of preparing gem-pentamethylcyclohexanes which comprises contacting a mixture of a $C_7$ naphthene and paraffin hydrocarbon having at least eight carbon atoms at a temperature in the range of 0–60° C. and in the absence of a hydrogen atmosphere with a catalyst selected from the group consisting of $AlCl_3$–HCl catalyst and $AlBr_3$–HBr catalyst, separating from the reaction mixture a fraction containing pentamethylcyclohexanes including both gem and non-gem isomers, and distilling said fraction to obtain a distillate composed mainly of gem-pentamethylcyclohexanes.

15. Method according to claim 14 wherein the temperature is in the range of 20–45° C.

References Cited by the Examiner

UNITED STATES PATENTS

| | | | |
|---|---|---|---|
| 2,088,598 | 8/1937 | Ipatieff et al. | 260—666 |
| 2,385,300 | 9/1945 | Pines et al. | 260—666 |
| 2,420,086 | 5/1947 | McAllister et al. | 260—666 |
| 3,004,082 | 10/1961 | Meisinger | 260—666 |
| 3,104,266 | 9/1963 | Kron | 260—666 |

DELBERT E. GANTZ, *Primary Examiner.*

ALPHONSO D. SULLIVAN, *Examiner.*